(12) United States Patent
Danner

(10) Patent No.: US 9,081,532 B2
(45) Date of Patent: Jul. 14, 2015

(54) METHOD AND COMPUTER PROGRAM PRODUCT FOR OUTPUTTING DOCUMENT DATA DIVIDED INTO PAGES

(75) Inventor: Horst Albert Danner, Munich (DE)

(73) Assignee: Océ Printing Systems GmbH, Poing (DE)

( * ) Notice: Subject to any disclaimer, the term of this patent is extended or adjusted under 35 U.S.C. 154(b) by 241 days.

(21) Appl. No.: 13/180,761

(22) Filed: Jul. 12, 2011

(65) Prior Publication Data

US 2012/0008168 A1    Jan. 12, 2012

(30) Foreign Application Priority Data

Jul. 12, 2010   (DE) .......................... 10 2010 036 336

(51) Int. Cl.
| | |
|---|---|
| G06K 15/10 | (2006.01) |
| G06F 3/12 | (2006.01) |
| G06F 21/60 | (2013.01) |

(52) U.S. Cl.
CPC ............ *G06F 3/1285* (2013.01); *G06F 3/1206* (2013.01); *G06F 3/1243* (2013.01); *G06F 3/1247* (2013.01); *G06F 21/608* (2013.01)

(58) Field of Classification Search
USPC ...................................... 358/1.12–1.15, 3.28
See application file for complete search history.

(56) References Cited

U.S. PATENT DOCUMENTS

| | | | |
|---|---|---|---|
| 5,822,506 A | 10/1998 | Chen et al. | |
| 7,630,519 B2 * | 12/2009 | Nagarajan | ..................... 382/112 |
| 2003/0081245 A1 * | 5/2003 | Simpson et al. | ............. 358/1.15 |
| 2004/0120013 A1 * | 6/2004 | Elkady et al. | ................. 358/1.18 |
| 2005/0052672 A1 * | 3/2005 | Talluri et al. | .................. 358/1.12 |
| 2006/0028689 A1 * | 2/2006 | Perry et al. | ..................... 358/3.28 |
| 2006/0203289 A1 * | 9/2006 | Miyata | .......................... 358/1.18 |
| 2007/0061474 A1 * | 3/2007 | Quach et al. | ................... 709/229 |

(Continued)

FOREIGN PATENT DOCUMENTS

EP        0 651 318 A2    10/1994

OTHER PUBLICATIONS

PCL 5 Printer Language Technical Reference Manual—HP Part No. 5961-0509, First Edition, Oct. 1992.

*Primary Examiner* — Marivelisse Santiago Cordero
*Assistant Examiner* — Kevin Ky
(74) *Attorney, Agent, or Firm* — Schiff Hardin LLP

(57) ABSTRACT

In a method to output document data divided into pages at an output printing apparatus, a print file encoded in a page description language is provided with per-page variable document data and bin command data, the bin command data referring to at least one page input tray of a reference printing apparatus for page-shaped recording material. The page input tray is provided to accept form pages with at least one pre-print image. At least one macro data set is created that contains a group of commands of the page description language and pre-print image data with which the pre-print image can be reproduced as a rastered image. Association data are generated for an association between the bin command data and the macro data set. The print file is sent as a data stream from a document data computer to a controller. In the controller the variable document data are merged and rastered with the pre-print image data using the bin command data and the association data. The rastered document data and the pre-print image data are printed on an output recording material in the output printing apparatus.

10 Claims, 1 Drawing Sheet

(56) References Cited

U.S. PATENT DOCUMENTS

| | | | |
|---|---|---|---|
| 2007/0076278 A1* | 4/2007 | Nagarajan | 358/538 |
| 2007/0268519 A1* | 11/2007 | Appercel et al. | 358/1.15 |
| 2008/0130034 A1* | 6/2008 | Wallin | 358/1.15 |
| 2010/0092201 A1* | 4/2010 | Kielland | 399/72 |
| 2010/0157391 A1* | 6/2010 | Sato | 358/498 |
| 2010/0165377 A1* | 7/2010 | Has | 358/1.15 |
| 2011/0261393 A1* | 10/2011 | Lemoine | 358/1.15 |
| 2011/0267632 A1* | 11/2011 | Wu et al. | 358/1.9 |

* cited by examiner

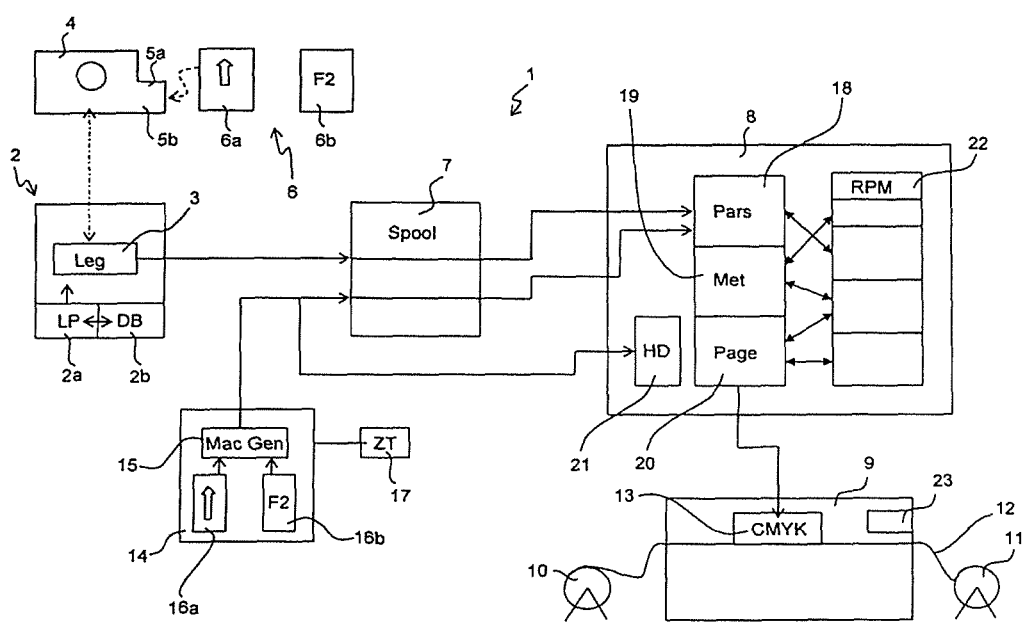

METHOD AND COMPUTER PROGRAM PRODUCT FOR OUTPUTTING DOCUMENT DATA DIVIDED INTO PAGES

BACKGROUND

The preferred embodiment concerns a method and a computer program product to output document data divided into pages, in particular to output to a printing apparatus.

A plurality of encodings—what are known as page description languages (PDL)—have been developed for the creation, transfer and output of document data. Different page description languages have proven to be particularly suitable depending on the type of application (for example for the creation of predominantly text documents or graphic documents) or according to the amount of data (for example for smaller data amounts in an office environment or for large amounts of data in the generation of invoices from databases).

For example, the Page Command Language (PCL) for the output of documents to printing apparatuses (developed by the Hewlett-Packard Company, Palo Alto, U.S.A.) is frequently used in office environments. The PostScript (PS) language (developed by Adobe Systems Inc., San Jose, U.S.A.) is frequently used in graphical advertisements. The Advanced Function Presentation (AFP) language, including diverse architecture specifications and developments—for example the Mixed Object Content Architecture (MO:DCA), and especially the Intelligent Printer Data Stream (IPDS) language used to control corresponding digital high-capacity printing systems—is used most often for the printing of large data sets from databases. These latter cited languages and architectures were originally developed by the International Business Machines Corp., Armonk, U.S.A. and today are developed as an open standard in the AFP Consortium (www.afpcolor.org), an industry consortium.

Recently, the Portable Document Format (PDF)—originating from Adobe Systems Inc., San Jose, U.S.A.—has been established for the exchange of document data between different application programs both in the office field and in the graphical field. Furthermore, the Personalized Print Markup Language (PPML) format, developed in the Print On Demand Initiative (PODi) industry consortium, Rochester, U.S.A, is known for printing from databases.

Due to the plurality of possible technical environments in the creation, relaying and output of document data, difficulties often arise with regard to the compatibility, transfer security, data loss or even the processing speed. With regard to security, in invoice printing it is particularly important that, in the porting of an existing application for the output of invoice data from a database to a new output system, it is ensured that all processing steps in the new environment run reliably and without error. Therefore, security-critical workflows are optimally left unchanged in such portings, and the modifications that arise due to the porting are optimally linked to those process steps (or to software components controlling these) that are less relevant to security.

The page description language PCL 5 is described in the PCL 5 Printer Language Technical Reference Manual, Hewlett-Packard Company, HP Part No. 5961-0509, 1st edition, October 1992, for example. There Output Bin Selection Commands are specified on Pages 4-15, what are known as macros, are described and macro commands are specified on Pages 12-1 through 12-110, and the calling of macros and the use of the "auto macro overlay" function are described on Page 24-9. These contents are herewith incorporated by reference into the present Specification.

An MO:DCA printing system in which control commands—what are known as Medium Modification Control (MMC) commands—related to the recording material are provided with which control functions for the recording material can be executed in the printing apparatus (for example the selection of a feeder tray) is known from EP 0 651 318 A2.

A printing system in which a background information is provided and is printed as a background on demand in order to achieve a copy protection for printed originals is known from US 2008/0130034 A1.

SUMMARY

To output document data divided into pages in which variable document data and what are known as bin command data are provided, wherein the bin command data refer to at least one sheet input tray of a reference printing apparatus for page-shaped recording material, it is an object to enable a porting in which the data can also be correctly output to an output printing apparatus that has no corresponding page input bins or page-shaped recording material.

In a method to output document data divided into pages at an output printing apparatus, a print file encoded in a page description language is provided with per-page variable document data and bin command data, the bin command data referring to at least one page input tray of a reference printing apparatus for page-shaped recording material. The page input tray is provided to accept form pages with at least one pre-print image. At least one macro data set is created that contains a group of commands of the page description language and pre-print image data with which the pre-print image can be reproduced as a rastered image. Association data are generated for an association between the bin command data and the macro data set. The print file is sent as a data stream from a document data computer to a controller. In the controller the variable document data are merged and rastered with the pre-print image data using the bin command data and the association data. The rastered document data and the pre-print image data are printed on an output recording material in the output printing apparatus.

BRIEF DESCRIPTION OF THE DRAWING

Drawing FIG. 1 illustrates in schematic fashion the printing system of the preferred embodiment for outputting document data divided into pages.

DESCRIPTION OF THE PREFERRED EMBODIMENT

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

In particular, a complete and correct output of a print job can be achieved with the preferred embodiment when the corresponding print file contains bin command data, wherein a page-shaped recording material that is pre-printed with a pre-print image (form pre-print) is associated with the page input bin, independent of the availability of the pre-printed recording material.

According to the preferred embodiment, a print file encoded in a page description language is provided that contains the variable document data and bin command data to be output per page. The bin command data refer to at least one page input bin of a reference printing apparatus for page-shaped recording material. The page input bin is provided to accommodate form pages with at least one pre-print image. Furthermore, a macro data set is created that contains a group of commands of the page description language as well as pre-print image data with which the pre-print image can be reproduced as a rastered image. Furthermore, association data are generated for an association between the bin command data and the macro data set. The print file is sent as what is known as a legacy data stream from a document data computer to a control unit (controller) in which the variable document data are merged and rastered in a page-specific manner with the pre-print image data using the bin command data and the association data. The rastered document data are then printed together with the pre-print data on an output recording material in an output printing apparatus.

The preferred embodiment is based on the realization that in print files that are generated from unmodified computer programs originating from earlier system environments (legacy files) and that have bin commands related to pre-printed, page-shaped recording material (pre-printed page form pages) can be ported to arbitrary systems when the bin command data are converted into rasterizable electronic output data at the output system so that the pre-print image of the form is generated electronically and then printed on a neutral output recording material. The application is then independent of the type of output recording material (page-shaped or web-shaped) and the availability of the recording material (form page) is pre-printed with the concrete pre-print image as such.

Print data that refer to individual pages (what are known as cut-sheet data) can be output at printing apparatuses that print on web-shaped recording material (what are known as continuous feed printers). In particular, it can thereby be achieved with the preferred embodiment to make a format selection using a bin command or the respective associated bin so that the format printed in the continuous feed printer corresponds to the underlying single page format.

It is an additional advantage of the preferred embodiment that a simple exchange of the pre-print image is possible via the association of an electronic pre-print image without having to exchange the pre-printed recording material itself (for example a pre-printed paper sheet). An intensive provisioning of the printing system with pre-printed material, and in particular a scrapping of the material when (for example) something changes at a pre-printed letterhead, can therefore be spared. For example, when the name of a director of the firm who is named on the letterhead changes, it is only necessary to modify the corresponding electronic file that contains the officer names (for example) once.

It is advantageous if the output printing system is a digital color printing system, for example a CMYK printing system based on the electrographic technique or on the inkjet technique, with print groups in the colors cyan (C), magenta (M), yellow (Y) and black (K). Pre-prints of practically all colors can then be reproduced true to the original at the output printing system. An additional print group with a client specific special color—for example for the true-color printing of company logos—can be provided as needed. Print jobs with large quantities of documents can be output from databases with a correspondingly high print speed of multiple hundreds to over 1000 pages A4 per minute.

In the advantageous exemplary preferred embodiment of the invention, the pre-print image data and at least a portion of the document data are first superimposed with accurate position and then rastered, wherein the superimposition is controlled by the bin command data. In particular, depending on the application case—for example depending on the data type, depending on the controller equipment, depending on the speed requirement etc.—it can thereby be set whether the pre-print image data are first rastered in the controller and the rastered document data are then superimposed on them; whether the document data are rastered first and the pre-print image data are then superimposed on these; or whether all of these data are rastered essentially simultaneously or in parallel in a common work step. Variable document data and pre-print image data that are connected specifically per page can then in particular be rastered together as a whole.

The order and/or additional raster parameters can in particular be configurable individually for the data type. In the data stream, the pre-print image data can in particular be appended at the end or after the variable document data.

The data of the print file that are encoded in the page description language can first pass through a parsing process in the controller, in which parsing process they are interpreted in the page description language. In this process the variable document data can already be merged per page with the pre-print image data before they are rastered in the controller. The merging advantageously takes place by means of data in the encoding of the page description language, for example via the logical merging or superimposition of correspondingly encoded objects. The merging can also take place in an intermediate format that has a per-object encoding, for example in an internal format (machine language) of a raster image processor (RIP) or of a controller internal to the printing apparatus.

Via such a connection or superimposition of the variable document data with the pre-print image data on the basis of the objects encoded in the page description language, the process duration over the entire data processing process up to the printing is markedly shorter in comparison to the process duration if the objects are only superimposed after the rastering. Very large print jobs that comprise a few thousand to over hundreds of thousands of documents can thereby also advantageously be printed out with high-capacity printing systems without a print stop, for example with a printing speed of multiple hundreds to over a thousand A4 pages per minute.

An additional execution of the bin commands advantageously no longer takes place in the printing of the rastered document data and pre-print image data in the output printing apparatus.

The preferred embodiment is particularly advantageously applicable to print files that are present in the Page Command Language (PCL) print language, wherein PCL bin commands are provided both for specific feed bins and for the differentiation of the front and back side of a page-shaped recording material. PCL print files that have previously been output on pre-printed pages at single page printing systems can then be output on a recording material that is not pre-printed. The porting of the printing process to a web printing system with web-shaped recording material that is not pre-printed is thereby possible in particular.

The association data for the association between the bin command data and the macro data set can in particular be stored in an association table. Association data and association tables are used as synonymous terms in the subsequent specification; however, it is clear that association data can also be generated, stored or processed in a different manner (not as a table, for example), for example as a comma-separated file or in the form of a database.

The association table and/or the macro data set can advantageously be transferred independent of the print file to the parsing RIP controller and/or the controller internal to the printing apparatus. A chronological, spatial and system-related independency thereby results. For example, an association table and macro data set can be created at an independent computer system and can then be transferred via a network, a data medium or the like to the controller in advance, such that these are already available when a print file is sent to the control for additional processing and subsequent printout.

The print file, macro data set, and the association table can in particular be stored and/or processed independent of one another in the respective controller. Depending on the application, they can also be transferred together from the document data computer to the controller. However, there they can be stored and processed independent of one another. Given joint transfer, depending on the application it can be advantageous to nevertheless maintain a specific order, namely first the print file, then the macro data set, then the association table, and last the print file, or first the association table, then the print file, and last the macro data set.

At least a portion of the document data and/or pre-print data can be stored in the controller on a non-volatile memory (for example a hard disk). The data can also be stored wholly or partially in a volatile memory (RAM, working memory). Document data and/or pre-print data can also be processed without buffering in the controller. It is then advantageous to send these data to the controller last because these are then used only for direct processing or execution. In order to save on resources, during the processing of a print job in the controller it is advantageous to store at the same point in time only data of less than or at most one document page, or of only a few document pages, for example at most 10 document pages.

Creation, merging, storage and/or association of the macro data set in a printing system can in particular take place at the control panel of a printing apparatus. The controller can be provided as hardware, as an individual computer program product or as firmware, and in particular can be integrated into a correspondingly different system, for example into a print server or into an output printing apparatus.

Exemplary preferred embodiments of the invention are described in detail in the following with reference to the drawing labeled FIG. 1.

Print files are generated in a printing system 1 with a document generation computer 2. In a legacy print file 3 (encoded in the PCL format) that is generated from a database 2b with a legacy computer program product 2a, contained in addition to variable document data from the database are bin commands that concern only a single sheet printing apparatus 4 (cut-sheet print system) designed for black-and-white printing, in which cut-sheet print system 4 a color, pre-printed single sheet 6 is in turn placed in one of the two feed bins 5a, 5b. For example, the pre-printed single sheet here contains on its front side a green arrow directed upward. The back side of the single sheet is shown with reference character 6b and bears a pre-printed yellow "F2". In order to print the legacy print file 3 as a print job on a printing apparatus 9 that prints on a paper web 12 instead of single sheets, the legacy print file 3 is sent via a spool system 7 or also via an output management system (OMS) to a controller 8 in which control data for the web printer 9 (continuous feed print system) are generated from the bin command data. The print head 13 of the continuous feed print system 9 comprises print groups in four colors (CMYK) so that form pre-prints with color form data can also be simulated. The paper web 12 is supplied from a take-off roller 10 to the print group 13, and after the printing is accepted by a take-up roller 11.

In order to be able to convert the bin command data in the controller 8 so that these can be converted into suitable control signals for the web printer 9 or its print head 13, two PDF files 16a, 16b whose data correspond precisely to the form prints 6a, 6b in the images (arrow F2) are processed in the computer 14 by means of a macro generator 15 based on a computer program. The data regarding the arrow of the file 16a in turn contain a coding for the color green; and the data of the "F2" contain a coding for the color yellow. The macro generator 15 thereby associates each of the two files 16a, 16b with a specific bin command, and stores the association as data in the association table 17. Both the image files 16a, 16b and the association table 17 are then sent to the spool system 7 and to the controller 8, wherein the association table 17 is stored in the spool system 7 and in the parser 18 of the controller 8 and the PDF files 16a, 16b are stored in a memory 21 (hard disk, HD or working memory, RAM) of the controller 8. The association table 17 and/or the creation of the macro data set can selectively also be created at the control panel 23 of the continuous feed print system 9, can be sent to the controller 8, computer 14 and/or spooler 7 or can be deleted from and/or modified in association tables originating there.

The image files 16a, 16b can exist wholly or partially in an electronically rastered document data format, for example in a bitmap format. Then they do not need to be rastered together with the variable document data in the controller 8 but rather can be superimposed directly on the rastered document data. The image files can be imported via an interface into the computer 14 from an external template source.

A plurality of print jobs can be buffered in the spool system 7 and can be output to the web printer 9 as soon as this is ready to print, or can be sent as needed to an output management system or to a print server that then distributes the pending print job or print jobs to multiple printing apparatuses.

In the course of the transfer of the legacy print file 3 from the document generation computer 2 via the spool system 7 to the controller 8, bin commands that refer to feed bin 5a, 5b are replaced with corresponding macro identifiers in the spool system 7 or in the controller 8 using the association table 17. The entire data stream is then executed in a parser 18 of the controller 8. Rastered image data are then generated by means of suitable command sets and/or internal translations in the metacode processor 19 and in the raster modules 22 and are output per page at the continuous feed print system 9 in the page processor 20. The data of the PDF images 16a, 16b associated with the respective macros—which data are stored in the memory 21—are then merged with the remaining variable data of the legacy print file and are superimposed, and page-specific, complete data of the documents to be printed are sent to the continuous feed print system 9 from the page processor 20. The printed pages then contain both the pre-print images and the variable data in a page-specific manner, such that the ultimately printed print good is identical per page to the pages on the pre-printed form sheet 6 that are generated by printing apparatus 4 with the same legacy print file.

A control as it can take place in the page description language PCL 5, which was specific in the aforementioned publication by the Hewlett-Packard Company, is described in the following.

The pre-prints for front and back sides are represented by a respective macro (single bin-related macros). Both customer-specific macros (customer macros) and macros generated outside of the customer environment (downloaded macros) are possible. The use of a customer macro guarantees the independence of macros of the respective print application from which the document data are generated.

The association of the macros with a feed bin, the overwriting of an association and the deletion of one or all associations take place via a newly introduced ID in an alphanumeric command.

The execution of bin-related macros takes place via bin selection commands, for example via the command <ESC>&l#H, wherein # stands for the number of the feed bin and can assume values between 1 and 99.

A current, bin-related macro is ended by the selection of a different feed bin per bin selection command, or by the paper format selection command <Esc>&l#A if no bin selection command was selected on the current page—such a thing would have priority—and if the bin was marked as LOCKED via the alphanumeric command. It is thereby possible to print material that is not pre-printed (plain paper) without explicit bin selection.

However, for speed reasons, or in order to facilitate the creation of the pre-print macros, it can also be reasonable to superimpose the pre-prints before the print job (mapping). However, a certain dependency on the transparency settings of the print job thereby arises. With regard to a certain printout, it is therefore advantageous to print pre-prints at the end of a page.

Requirements for the Macros

Macros that are used to depict pre-prints are in particular designed such that the already mapped variable content is not overwritten, or is only overwritten to a provided degree. In particular, the "Source Transparency" setting is used. The setting "ROP136" can also be used.

For speed reasons it is advantageous to optimally load the pre-print macros before the macros of the print job (the application). If an associated macro is deleted, printing is in particular continued without this macro.

Administration Functions

The administration of the template macros takes place via the PCL Alphanumeric ID command <Esc>&n#W. This is thereby a block transfer command, wherein the actual functionality is determined by the # byte-large data block. The first byte of the data block is the command ID; all additional bytes are command-specific. CommandID and SubID are selected so that they can be represented as upper-case ASCII letters. Therefore, no hex representation is necessary in the examples.

The association of macros and feed bin (tray) takes place via the Alphanumeric Command ID 0x4F ("O") and the SubIDs 0x46 ("F") for the front side of the sheet and 0x42 ("B") for the back side of the sheet.

Structure of the Association Command

| Command ID |
| --- |
| 0x4F ('O') |
| Sub ID |
| 0x46 ('F') or 0x42 ('B') |
| Number of the tray |
| LINEFEED |
| Number of the macros |

Example

| <Esc>&n9WOF 22 <LF> 7823 | Front page Tray 22: Macro 7823 |
| --- | --- |
| <Esc>&n9WOB 22 <LF> 7826 | Back page Tray 22: Macro 7826 |
| <Esc>&n8WOB 12 <LF> 3121 | Back page Tray 12: Macro 3121 |

It is not necessary that both pages are assigned to a tray.

Structure of the Deletion Command

| Command ID |
| --- |
| 0x4F |
| SubId |
| 0x49 ('I') |
| Number of the tray |

Example

<Esc>&n4W OI 22 Delete association(s) from Tray 22

All associations can be deleted at once (together) with the command 0x4F and SubID 0x41.

Structure of the Full Delete Command

| Command ID |
| --- |
| 0x4F |
| SubID |
| 0x41 ('A') |

Example

<Esc>&n2W OA Delete association table

The trays at single-sheet printers can be marked as "pre-printed". These are then removed from the automatic selection by the paper format command (LOCKED). The corresponding mechanism is simulated via the corresponding command:

Structure of the LOCKED/Pre-Printed Command

| Command ID |
| --- |
| 0x4F |
| SubId |
| 0x4C ('L') |
| Number of the tray |

Example

<Esc>&n4W OL 11 Mark tray 11 as "pre-printed".

If the pre-print should likewise be generated with the paper format command <Esc>&l#A, i.e. without a new selection when a pre-print was already activated via tray selection at the preceding side, the tray is then marked as UNLOCKED.

Structure of the UNLOCKED Command

| Command ID |
| --- |
| 0x4 F |
| SubId |
| 0x55 ('U') |
| Number of the tray |

Example

<Esc>&n3W OU 7 Tray 7 contains "not pre-printed" paper.

In summary, the following can be established from the aforementioned Specification.

Legacy document data that contain variable document and bin commands which refer to feed trays of single sheet printers that are provided to accept form pre-print sheets are output on unprinted and in particular web-shaped material. For this macro data sets are associated with the corresponding bin commands, in which macro data sets image data are contained that correspond to pre-print images of the form pre-print sheets. Furthermore, association data are generated for an association between the bin command data and the macro data set. The variable document data are superimposed and rastered specifically per page with the image data using the association data and are supplied to an output printing apparatus for printing on the unprinted material. The variable document data and the pre-print image data can be connected and rastered specifically per page using the bin command data and the association data.

The preferred embodiment is in particular suitable to be realized wholly or partially as a computer program (software). It can therefore be distributed as a computer program module as a file on a data medium such as a diskette or CD-ROM, DVD or as a file via a data or communication network. Such comparable computer program products or computer program elements are embodiments of the invention. The workflow according to the preferred embodiment can be applied in a computer, in a printing apparatus, or in a printing system with upstream or downstream data proximity apparatuses. It is therefore clear that corresponding computers on which the preferred embodiment is applied can contain additional, known technical devices such as input units (keyboard, mouse, touchscreen, a microprocessor, a data or control bus, a display device (monitor, display) and a working memory, a hard disk storage and a network card.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

I claim as my invention:

1. A method to output document data divided into pages at a continuous feed output printing apparatus, comprising the steps of:
   providing a reference printing apparatus for input and output of a single sheet page-shaped recording material and having a first page input tray as a bin for accepting a plurality of single sheets which are to be printed on and at least a second page input tray as a bin for accepting at least a single sheet form page with at least one pre-print image thereon which is also to be printed on;
   providing a document data computer having a print file encoded in a page description language with per-page variable document data and bin command data, the bin command data referring to said at least second page input tray for selection thereof instead of said first input tray to provide said form page when variable document data is to be printed on said form page and not on one of the single sheets in the first input tray without user interaction;
   also providing a continuous feed output printing apparatus for printing continuous feed output recording material comprising a continuous recording material web;
   creating at least one macro data set that contains a group of commands of the page description language and pre-print image data with which the at least one pre-print image can be reproduced as a rastered image;
   generating association data for an association between the bin command data and the macro data set;
   when it is desired by a user to utilize said continuous feed output printing apparatus rather than said single sheet reference printing apparatus but still use said same print file, said document data computer sending the print file as a legacy data stream from said document data computer to a controller which controls said continuous feed output printing apparatus;
   in the controller merging and rastering the per page variable document data with the macro data set pre-print image data using the bin command data and the association data; and
   printing the rastered document data and the pre-print image data on said continuous feed output recording material web in the continuous feed output printing apparatus.

2. The method according to claim 1 wherein the bin command data are called to control superimposition, and the macro data set associated with the bin command data is called by means of the association data, and wherein the superimposition takes place on the basis of objects encoded in a page description language.

3. The method according to claim 1 wherein the data of the print file first pass through a parsing process in the controller, in said parsing process the data are interpreted in the page description language, and the variable document data are merged per page with the pre-print image data before they are rastered in the controller.

4. The method according to claim 3 wherein the pre-print image data and the variable document data are superimposed with one another precisely per page and are then rastered together.

5. The method according to claim 1 wherein no further application of the bin command data takes place in the printing of the rastered document data and the rastered pre-print image data in the output printing apparatus.

6. The method according to claim 1 wherein the page description language is Page Command Language PCL, the bin command data form a PCL bin command, and an additional bin command is used to differentiate a front side and a back side of the form pages.

7. The method according to claim 1 wherein the print file, the macro data set, and the association data are stored or processed in the controller independent of one another.

8. The method according to claim 1 wherein the print file, the macro data set, and the association data are transferred together from the document data computer to the controller and are stored and processed there independent of one another.

9. The method according to claim 1 wherein page language-specific feed tray commands are contained in the macro data set, and at least letterhead data are contained as said pre-print image data.

10. A tangible non-transitory computer readable medium having a computer program thereon to generate or process association data to output a print file to a continuous feed output printing apparatus, said print file containing document data divided per page, said program performing the steps of:
    providing a reference printing apparatus for input and output of single sheet page-shaped recording material and having a first page input tray as a bin for accepting a plurality of single sheets which are to be printed on and at least a second page input tray as a bin for accepting at least a single sheet form page with at least one pre-print image thereon which is also to be printed on;

providing a document data computer having a print file encoded in a page description language with per-page variable document data and bin command data, the bin command data referring to said at least second page input tray for selection thereof instead of said first input tray to provide said form page when variable document data is to be printed on said form page and not on one of the single sheets in the first input tray without user interaction;

also providing a continuous feed output printing apparatus for printing continuous feed output recording material comprising a continuous recording material web;

creating at least one macro data set that contains a group of commands of the page description language and pre-print image data with which the at least one pre-print image can be reproduced as a rastered image;

generating association data for an association between the bin command data and the macro data set;

when it is desired by a user to utilize said continuous feed output printing apparatus rather than said single sheet reference printing apparatus but still use said same print file, said document data computer sending the print file as a legacy data stream from said document data computer to a controller which controls said continuous feed output printing apparatus;

in the controller merging and rastering the per page variable document data with the macro data set pre-print image data using the bin command data and the association data; and printing the rastered document data and the pre-print image data on said continuous feed output recording material web in the continuous feed output printing apparatus.

* * * * *